(12) United States Patent
Madau et al.

(10) Patent No.: US 9,570,926 B2
(45) Date of Patent: Feb. 14, 2017

(54) DETERMINING A RE-CONFIGURATION OF A WIRELESS SURFACE WITH A MULTI-COIL SYSTEM

(71) Applicants: Dinu Petre Madau, Canton, MI (US); Gary Edward Zack, Novi, MI (US)

(72) Inventors: Dinu Petre Madau, Canton, MI (US); Gary Edward Zack, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 150 days.

(21) Appl. No.: 14/339,147

(22) Filed: Jul. 23, 2014

(65) Prior Publication Data

US 2016/0025477 A1 Jan. 28, 2016

(51) Int. Cl.
*H02J 7/00* (2006.01)
*H02J 7/02* (2016.01)

(52) U.S. Cl.
CPC .............. *H02J 7/0052* (2013.01); *H02J 7/025* (2013.01); *H02J 50/10* (2016.02); *H02J 7/0042* (2013.01)

(58) Field of Classification Search
CPC .............. H02J 5/005; H02J 7/025; H02J 7/35; H02J 50/00–50/90; H04B 5/00; H01F 38/14; Y02T 90/122; B60L 11/182; Y02E 60/12
USPC ........................................................ 320/108
See application file for complete search history.

(56) References Cited

U.S. PATENT DOCUMENTS

| | | | | |
|---|---|---|---|---|
| 2008/0079392 A1* | 4/2008 | Baarman | ............... | H02J 7/0072 320/108 |
| 2008/0111518 A1* | 5/2008 | Toya | ....................... | H02J 7/025 320/108 |
| 2008/0211455 A1* | 9/2008 | Park | ........................ | H02J 7/025 320/108 |
| 2009/0015197 A1* | 1/2009 | Sogabe | .................. | H02J 7/0011 320/108 |
| 2009/0230777 A1 | 9/2009 | Baarman et al. | | |
| 2010/0201513 A1 | 8/2010 | Vorenkamp et al. | | |
| 2010/0259217 A1 | 10/2010 | Baarman et al. | | |
| 2012/0212178 A1 | 8/2012 | Kim | | |
| 2013/0181664 A1* | 7/2013 | Min | ....................... | H02J 7/0052 320/108 |
| 2013/0221913 A1 | 8/2013 | Kim | | |
| 2013/0278206 A1 | 10/2013 | Won et al. | | |
| 2014/0002013 A1 | 1/2014 | Kossi et al. | | |

FOREIGN PATENT DOCUMENTS

EP 2493051 A2 8/2012
WO 2012/170822 A2 12/2012

OTHER PUBLICATIONS

WiTricity Announces Breakthrough Wireless Charging System for Consumer Electronic Devices Including iPhone 5—Revolutionary charging system wirelessly powers multiple devices over distance and through tabletops, http://www.businesswire.com/news/home/20140107005988/en, Jan. 7, 2014, (3 pages), Business Wire—A Berkshire Hathaway Company.
Singh, Manjit et al., "Wireless Power Charging with Spatial Freedom," http://www.low-powerdesign.com/120706-article-wireless-power-charging.htm, (4 pages), Low-Power Design.

\* cited by examiner

*Primary Examiner* — Arun Williams
(74) *Attorney, Agent, or Firm* — Dickinson Wright PLLC

(57) ABSTRACT

A system and method for determining a re-configuration of a wireless surface with a multi-coil system are provided. The system includes a reference generator to determine a reference parameter associated with the wireless surface; a recheck initiator to instigates a re-measurement; a re-measurer, in response to the initiated re-measurement, to measure a parameter associated with the reference parameter; and an analyzer to retrieve a determination about the wireless surface based on a difference between the measured parameter and the measured reference parameter.

8 Claims, 6 Drawing Sheets

206

| FREQUENCY 401 | VOLTAGE 402 | CURRENT 403 | DETERMINATION 404 |
|---|---|---|---|
| ↓ | ↑ | ↑ | MISALIGNMENT |
| = | = | = | ALIGNED (FULLY CHARGED) |
| ↑ | ↓ | ↓ | ALIGNED |

*FIG. 4*

DETERMINING A RE-CONFIGURATION OF A WIRELESS SURFACE WITH A MULTI-COIL SYSTEM

CROSS-REFERENCE TO RELATED APPLICATION

This application is related to U.S. patent application Ser. No. 14/339,025, filed on Jul. 23, 2014, which is assigned to the same assignee as the current application, and all of which are incorporated by reference in its entirety as if fully set forth herein.

BACKGROUND

Mobile electronics and devices are becoming increasingly popular. Often times, the mobile device includes an energy storage device, and employs the power in the energy storage device to operate the functionality associated with the mobile device. The mobile device may be, but is not limited to, a smart phone, a tablet, a laptop, or the like.

In order to charge the mobile device, a wired power charging system has been conventionally provided. An operator of the mobile device may connect the mobile device to a charging source (for example, a wall outlet or a vehicle electricity adapter), and wait for the device to become charged fully, or charged at higher level than affixed on the charging source. The connection may be permeated via a wire, or a socket associated with the mobile device that allows a user to plug in the mobile device into a charging source.

In recent years, the concept of wired charging has been replaced or augmented by wireless charging. The early implementations of wireless charging employed a coil that transmitted wireless energy to a mobile device. The mobile device would be equipped with a technique to receive the wireless energy, and translate the wireless energy to usable and storable power.

In this implementation, a singular coil is provided. Thus, an implementer of this sort of wireless charging may provide various indicia that serves to guide a user of a location or context of where to place the mobile device. In this way, the user is effectively guided in placing the mobile device in an area that optimizes and ensures wireless charging efficiency.

Recently, a plethora of mobile devices have been released. The various mobile devices each have different sizes and charging capabilities. Accordingly, the single coil system may not effectively serve the wireless charging demands of a user.

To counter this concern, a wireless surface or sheet is provided. Accordingly, a user may place their mobile device on the wireless surface or sheet, and in response to this action, initiate a charging of the wireless device. Thus, a user may not be prompted to place the device in a specific location.

The wireless surface or sheet, to permeate wireless charging, may be provided with multiple coils. Each coil may be selectively turned on and off at different times to initiate the charging of a mobile device. Each coil may wirelessly charge the mobile device with a varying amount of power and efficiency.

In certain situations, the wireless surface or sheet may be implemented in a moving environment. For example, if the wireless surface or sheet is implemented in a vehicle, the mobile device may move from one spot to another. In another example, the wireless surface or sheet may be in different locations. Accordingly, if a user or operator bumps the wireless surface or sheet, the mobile device may move. In these situations, because the mobile device is in a different location, the wireless charging efficacy may be changed.

SUMMARY

The system and method for determining a re-configuration of a wireless surface with a multi-coil system are provided. The system includes a reference generator to determine a reference parameter associated with the wireless surface; a recheck initiator to instigates a re-measurement; a re-measurer, in response to the initiated re-measurement, to measure a parameter associated with the reference parameter; and an analyzer to retrieve a determination about the wireless surface based on a difference between the measured parameter and the measured reference parameter.

DESCRIPTION OF THE DRAWINGS

The detailed description refers to the following drawings, in which like numerals refer to like items, and in which:

FIG. 4 illustrates a predetermined lookup table according to the example illustrated in FIG. 2.

DETAILED DESCRIPTION

Figure 1:
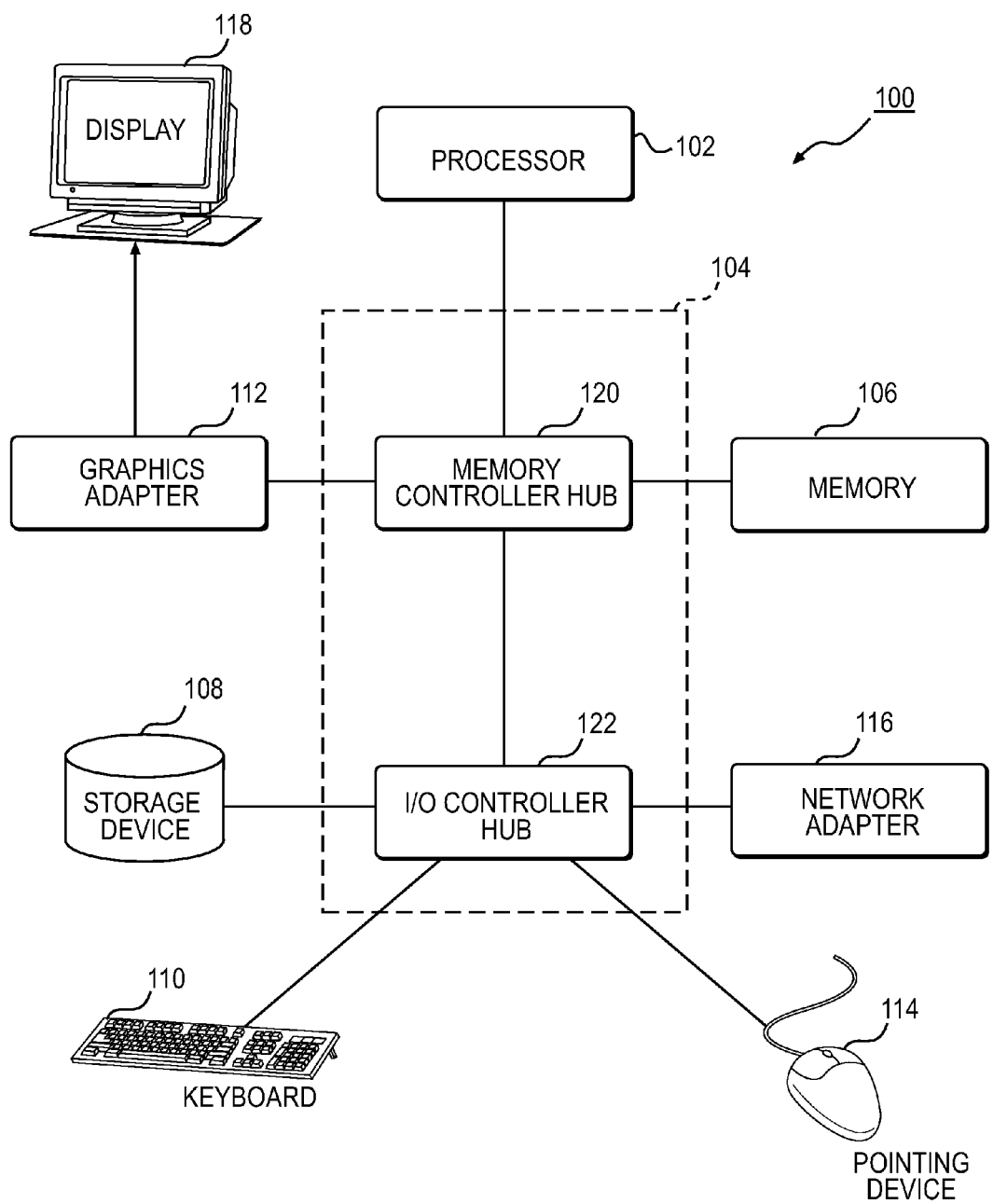
FIG. 1 is a block diagram illustrating an example computer.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Providing wireless charging to a user allows a mobile device to be effectively charged while avoiding the hassle of employing wires and other intermediary connecting techniques. In one example of wireless charging, a metal coil is employed to wirelessly generate energy, and transmits the energy over a space. A mobile device may be equipped with a receiver that receives the wireless energy, and translates the received wireless energy to power that may be employed to operate the device. A mobile device may be any device in which charging is required or employed, such as a smart phone, a tablet, a wearable watch, and the like.

As explained in the Background section, wireless surfaces may be implemented and provided to the user. Wireless surfaces have multiple coils (and thus, may be referred to as a "multi-coil system"). The multi-coil system may employ a plurality of coils, with each coil being capable of delivering energy to the mobile device.

Depending on the placement of the mobile device onto the wireless surface, the charging of an individual coil may be improved or worsened. The ability to charge a mobile device from a single coil is dependent on various factors, one of which is the location relative to the device being charged.

Thus, when multi-coil system is employed, charging from some of the coils situated and provided in the wireless charging surface may be inefficient. For example, if power is delivered to a coil with a low efficiency of charging, the efficacy of the wireless charging surface may be lessened as a whole. Also, because more coils are on than necessary or inefficient coils are on, excessive heating also becomes problematic.

However, a wireless charging system may not know the placement of the mobile device prior to the charging. Every time a user places a device on the wireless charging surface, the placement may be in a different location. Further, the placement may be dependent on other factors, such as the device being placed on the wireless charging surface, or the size of the device being placed down or the location of the coil in the mobile device. The wireless charging system may detect the placement; however, employing location detecting circuitry may render the wireless charging system expensive and bulky.

A related application, discussed in the cross-reference section of this application, discloses a technique for determining an optimum coil to wirelessly charge a mobile device. Thus, employing the aspects disclosed in that application, a coil may be selected based on a detection of a placed mobile device onto a wireless surface.

However, the mobile device may move or be displaced for a plurality of reasons. For example, if the wireless surface is placed in a moving environment, such as a vehicle, the movement forces of the vehicle may cause the mobile device to be displaced. In another example, the wireless surface, an area around the wireless surface, or the mobile device, may be bumped or agitated. The bumping or agitation may cause the mobile device to move. In this case, the selected coil as determined as optimal for charging may no longer be the most effective coil to wirelessly charge the mobile device.

Disclosed herein are methods and systems for determining a re-configuration of a multi-coil system based on a detected parameter. Employing the aspects disclosed herein, the methods and systems allow for a detection of a present efficiency of charging associated with a multi-coil system, and a re-configuration of the coil (or coils) employed to permeate the charging.

Thus, based on the concepts disclosed herein, even if a mobile device (or any chargeable device) is displaced during a charging session, the aspects disclosed herein allow for a re-configuration to ensure that a state of efficient charging may be returned to.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network.

Figure 2:
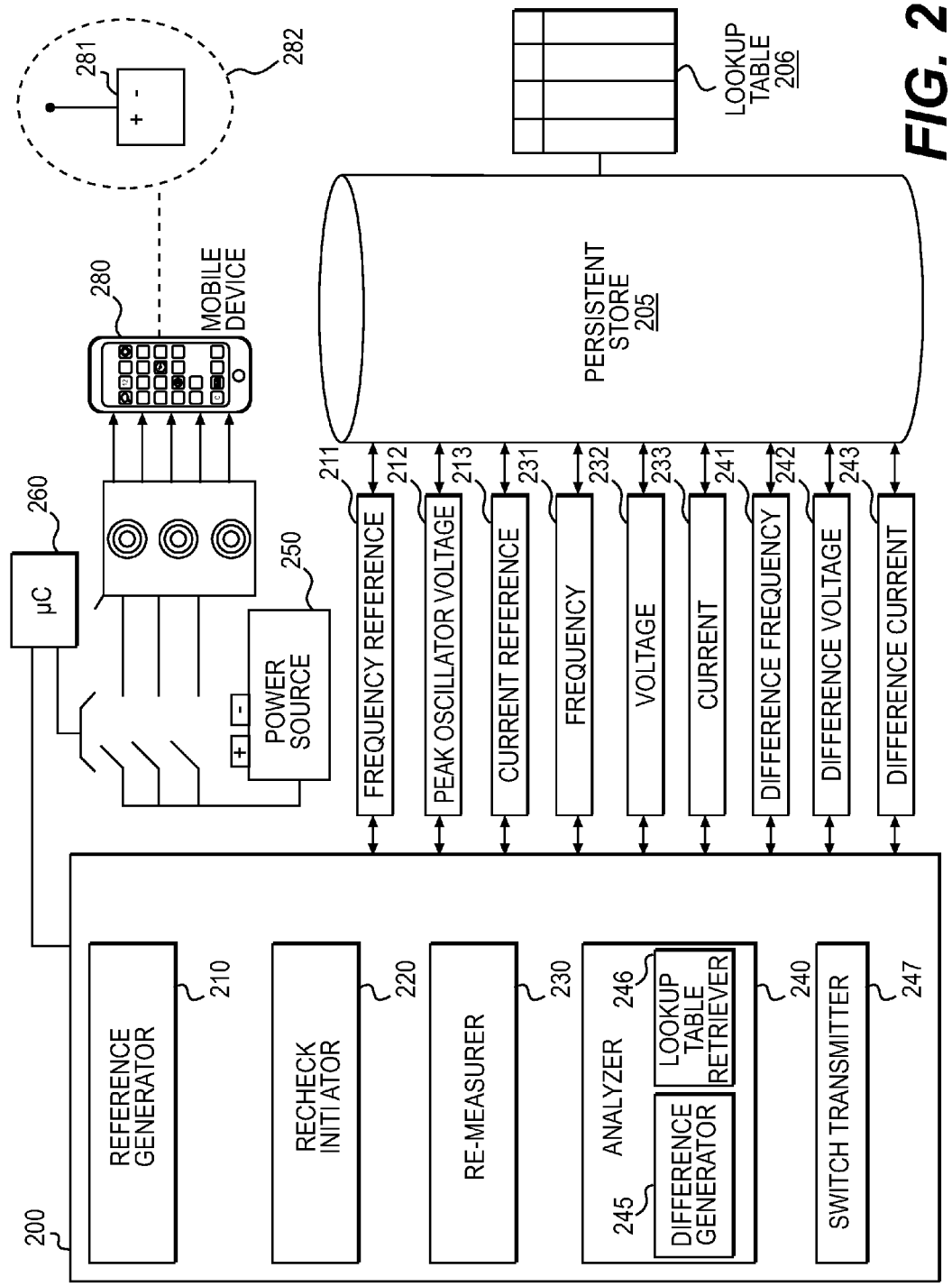
FIG. 2 is an example of an implementation of system for determining an efficiency of a multi-coil system based on a detected parameter.

FIG. 2 is an example of an implementation of system 200 for determining an efficiency of a multi-coil system based on a detected parameter. The system 200 includes a reference generator 210, a recheck initiator 220, a re-measurer 230, and an analyzer 240.

The system 200 may be implemented via a device, such as computer 100 described above. The system 200 may be implemented with a persistent store 205, which may be any of the storage devices enumerated above with regards to storage device 108, The system 200 communicates with a microcontroller 260. The microcontroller 260 may be any sort of switching controlling device that allows switches 251-253 to be selectively opened and closed. The switches 251-253, allow energy from a power source 250 to be transmitted to a corresponding coil (271-273) of a wireless charging surface 270.

The wireless charging surface 270 shown includes three coils (coils 271-273). In the example described below, three coils are shown; however, one of ordinary skill in the art may implement the aspects described herein with any number of coils greater than one. The coils 271-273 may be embedded in a surface or mat.

Referring to FIG. 2, the mobile device 280 is already in a state of wireless charging. A coil is selected (i.e. the driving switch is closed), employing any techniques known, or discussed in the related application.

The reference generator 210 measures a reference parameter based on an initial measurement of an interaction with the mobile device 280. The reference generator 210 may include a frequency reference 211, a Peak Oscillator Voltage reference 212, and a current reference 213. Each of the references 211-213 once measured may be stored in a temporary register, or in the persistent store 205.

Frequency may specifically refer to coil drive frequency. The transmitter employed for wireless charging may employ a transmitter coil "tank" circuit. The transmitter coil "tank" circuitry has a resonant frequency. Thus, the further the transmitter coil "tank" circuitry is to resonance, indicates that the coil being employed to charge an electronic device is operating an optimal efficiency.

The recheck initiator 220 instigates a measurement of the parameters measured by the reference generator 210. The recheck initiator 220 may communicate with a predetermined time register 225. Thus, after the predetermined time stored in the predetermined time register 225 has elapsed, the recheck initiator 220 may instigate the measurement.

In another example, the recheck initiator 220 may receive a signal (for example, generated by a command initiated on the wireless charging surface 270). In response to receiving the signal, the system 200 may initiate a re-measurement.

The re-measurer 230, in response to an indication from the recheck initiator 220, measures the parameters recorded by element 210. In various implementations of system 200, the three parameters discussed above may be selectively employed. For example, an implementation of system 200 may employ the frequency reference 211, and the voltage reference 212. Thus, re-measurer 230 may be configured to measure the present frequency reference and the present voltage reference.

The re-measurer 230 may store the various measured parameters in registers, such as frequency 231, voltage 232, and current 233. The registers may be association with the persistent store 205, or alternatively, be implemented along with system 200.

The analyzer 240 includes a difference generator 245 and a lookup table retriever 246. The difference generator 245 determines a difference between the values measured in elements 210 and 230. Accordingly, the difference between the frequency reference 211 and the frequency 231 may be stored in a difference frequency register 241. The difference between the voltage reference 212 and the voltage 232 may be stored in a difference voltage register 242. The difference between the current reference 213 and the current 233 may be stored in a difference current register 243. As stated above, one, some or all three of the parameters discussed above may be included in an implementation of system 200.

The lookup table retriever 246 retrieves a determination based on the detected difference. The detected differences may be correlated with various modes.

Figure 3A:
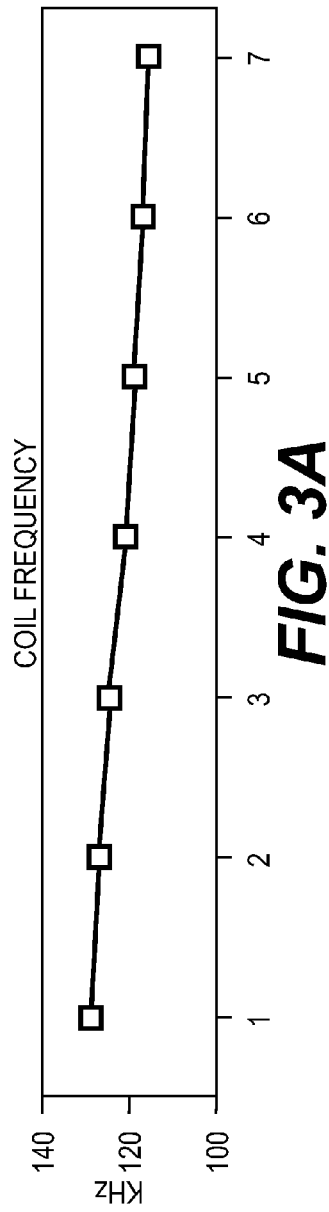
FIGS. 3(a)-3(c) illustrate an example of frequency, voltage, and current being changed via misalignment of a mobile device with a wireless charging surface.
Figure 3B:
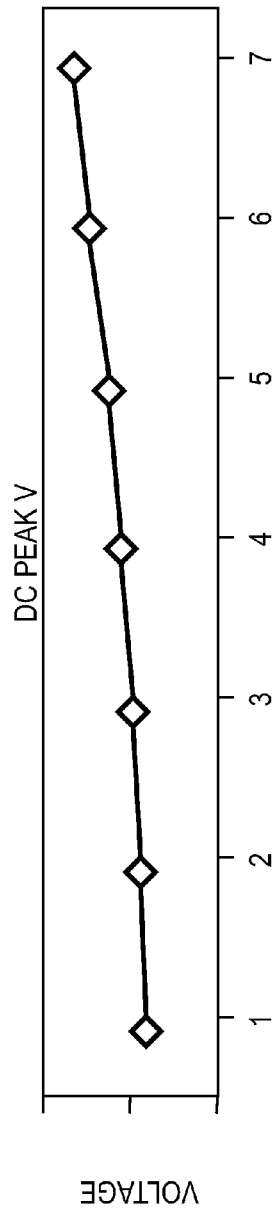
Figure 3C:
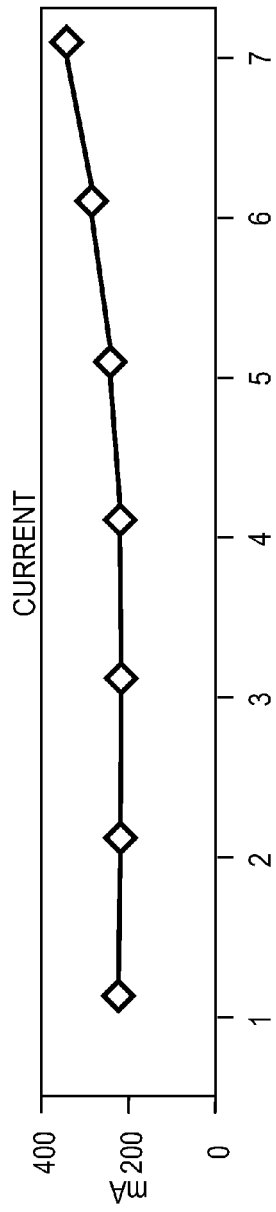

FIGS. 3(*a*)-3(*c*) illustrate an example of frequency, voltage, and current being changed via misalignment of a mobile device 280 with a wireless charging surface 270.

For example, in a normal case, i.e. where the mobile device 280 is not displaced (i.e. aligned), as the mobile device 280 is charging, the amount of voltage, current, and frequency may be maintained, or in certain cases lessened or increased. For example, if the mobile device 280 is fully charged, the wireless charging surface 270 may no longer supply power to the mobile device.

However, if the mobile device 280 is displaced (as shown in FIGS. 3(*a*)-(*c*) as increasing on the x-axis)—the voltage and current demands may be increased. Further, the coil frequency may decrease.

Thus, according to the aspects disclosed herein, employing the trends and values shown in registers 241-243 (or a combination thereof), the various trends may be stored in a predetermined lookup table 206.

FIG. 4 illustrates a predetermined lookup table 206. As shown, a frequency field 401, a voltage field 402, and a current field 403 is shown. Each field is correlated with a determination field 404. Based on the detected differences from the difference register 241-243, a determination is correlated. The values shown in FIG. 4 are merely exemplary, with a variety of predetermined determinations being configurable based on an implementer's preference.

The determination is then transferred to the microcontroller 250. The determination may indicate that the current wireless charging is efficient. As such, the present switch orientation is maintained. In another example, if a misalignment is detected, the microcontroller 250 may perform an operation to determine a more efficient coil arrangement (for example, see the related application noted in the cross-reference section of this application). In this case, the microcontroller 250 may be instructed to reconfigure which of the switches 251-253 are open and closed.

Figure 5:
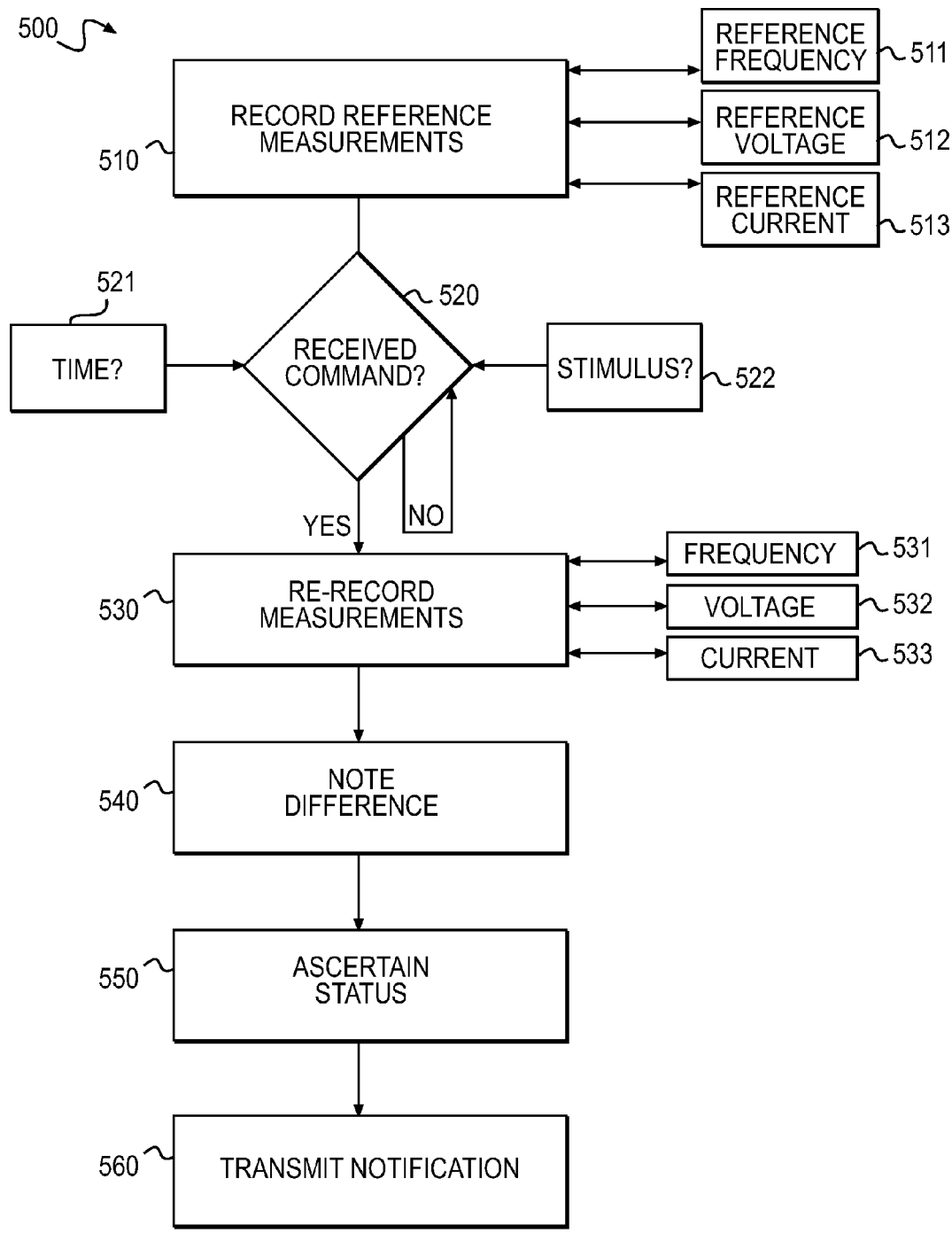
FIG. 5 is an example of an implementation of method for determining an efficiency of a multi-coil system based on a detected parameter.

FIG. 5 is an example of an implementation of method 500 for determining an efficiency of a multi-coil system based on a detected parameter. The method 500 may be employed and implemented with any of the elements shown in FIG. 2, such as microcontroller 260, switches 251-253, power source 250, wireless charging surface 270, coils 271-273, and mobile device 280.

In operation 510, a reference measurement of various parameters is recorded while a mobile device 280 is situated on or around a wireless charging surface 270. Prior to operation 510, one of the coils 271-273 may have been selected for optimal or efficient charging. In operation 510, a frequency associated with the wireless charging may be record (511), a voltage associated with the wireless charging may be recorded (512), or a current associated with the wireless charging may be recorded (513). Any combinations of operations 511-513 may be employed.

In operation 520, a command to detect status of the wireless charging is received. The command may be based on a predetermined time interval (operation 521) or a command may be received via an external stimulus (operation 522). For example, the wireless charging surface 270 may be equipped with a selection technique that allows a user or operator to initiate, thereby instigating status detection. If status detection is initiated, the method 500 proceeds to operation 530. If the status detection is not initiated, the method 500 remains at operation 520.

In operation 530, in response to a status detection being requested, the parameters measured and recorded in operation 510, are re-recorded. Thus, depending on an implementation of method 500, a frequency (531), a voltage (532), and a current (533) may be re-recorded.

In operation 540, the differences between the re-recorded parameters and the corresponding reference parameters are noted. In operation 550, the differences are correlated with a lookup table (such as lookup table 206, shown in FIG. 4). Based on operation 550, a present status of the wireless charging is ascertained. For example, the method 500 may determine that the wireless charging is properly aligned. In another example, the method 500 may determine that a misalignment is detected.

In operation 560, based on the ascertained status, a notification or command is transmitted to a wireless charging surface 270. In one example, a microcontroller 260 may be instructed to determine which switch 251-253 may correct the alignment (i.e. select the switch that allows for the most efficient charging). In another example, a light or indication might be transmitted to a user or operator indicating that the wireless charging is aligned (i.e. efficient) or misaligned (i.e. not efficient).

Figure 6A:
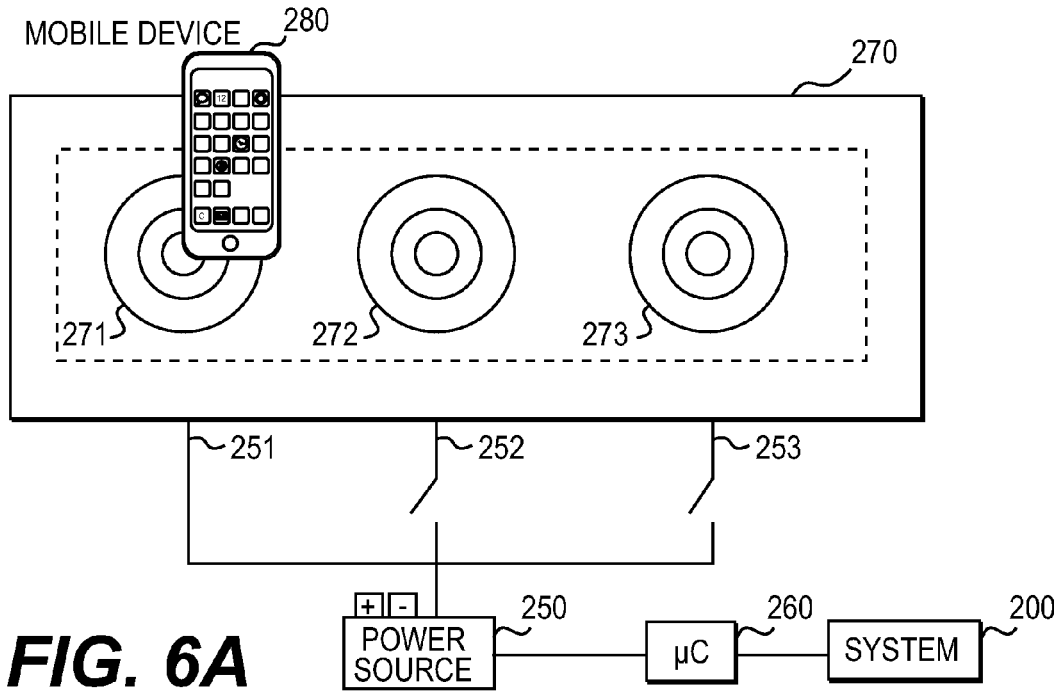
FIGS. 6(a) and 6(b) illustrate an example implementation of system shown in FIG. 2 or the method shown in FIG. 5.
Figure 6B:
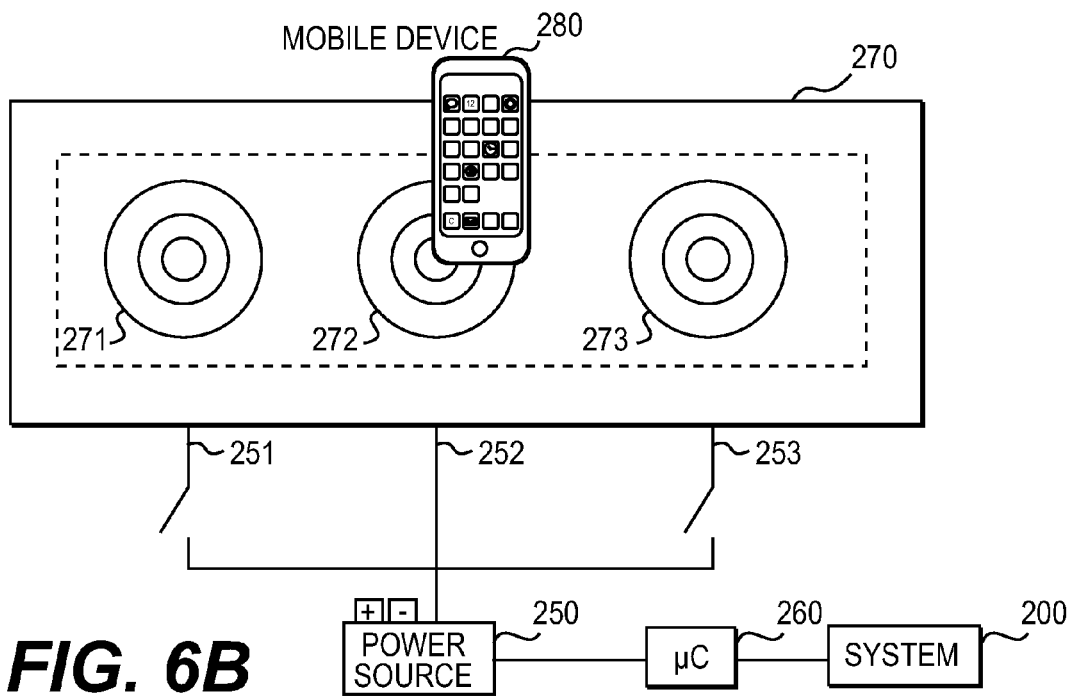

FIGS. 6(a) and 6(b) illustrate an example implementation of system 200 or method 500.

In FIG. 6(a), a mobile device 280 is placed on a wireless charging surface 270. As shown, the wireless charging surface 270 is connected to system 200. In FIG. 6(a), the switch 251 is closed (i.e. delivering power to mobile device 280 via coil 271 in a wireless fashion).

In FIG. 6(b), the mobile device 280 has been displaced. Accordingly, mobile device 280 is no longer in alignment with coil 271. Employing the aspects disclosed herein, the system 200 is capable of detecting that at least one of the parameters of frequency, voltage, or current has changed in a specific fashion, and may detect that the mobile device 280 is presently misaligned. Accordingly, system 200 may transmit an indication or command to a microcontroller associated with switches 251-253. As shown, switch 252 is now closed, due to the proximity of coil 272 being the closest to mobile device 280.

Thus, employing the aspects disclosed herein, a wireless charging surface that incorporate a multi-coil system, may effectively detect when a mobile device being charged is displaced, and is thus, misaligned.

We claim:

1. A system for determining a re-configuration of a wireless surface with a multi-coil system, comprising:
 a data store comprising a computer readable medium storing a program of instructions for the determination of the re-configuration;
 a processor that executes the program of instructions;
 a reference generator to determine a reference parameter associated with the wireless surface;
 a recheck initiator to instigates a re-measurement;
 a re-measurer, in response to the initiated re-measurement, to measure a parameter associated with the reference parameter; and
 an analyzer to retrieve a determination about the wireless surface based on a difference between the measured parameter and the measured reference parameter, and
 wherein the measured parameter is correlated to a predetermined alignment amount for each coil of the multi-coil system, and based on a determination of which one of the each coils is correlated to a lowest predetermined alignment amount, the determined which one of the coils is switched on to provide wireless power, and the non-determined coils are switched off to not provide wireless power.

2. The system according to claim 1, wherein the reference parameter is frequency.

3. The system according to claim 1, wherein the reference parameter is voltage.

4. The system according to claim 1, wherein the reference parameter is current.

5. The system according to claim 1, wherein the re-check initiator instigates the re-measurement based on a predetermined time interval.

6. The system according to claim 1, wherein the re-check initiator instigates the re-measurement based on a stimulus.

7. The system according to claim 1, wherein the reference parameter further comprises at least a first reference parameter, a second reference parameter, and a third reference parameter, and the first reference parameter is frequency, the second reference parameter is voltage, and the third reference parameter is current.

8. The system according to claim 7, wherein the wireless surface comprises a plurality of coils, and the determination correlates to whether the electronic device is aligned or misaligned.

* * * * *